United States Patent [19]

Langenfeld et al.

[11] Patent Number: 4,753,568

[45] Date of Patent: Jun. 28, 1988

[54] MATERIAL HANDLING ATTACHMENT FOR A TRACTOR HAVING A MULTIPLE-POINT HITCH ASSEMBLY

[75] Inventors: Joseph W. Langenfeld; Neal W. Westendorf, both of Onawa, Iowa

[73] Assignee: Westendorf Mfg. Co., Inc., Onawa, Iowa

[21] Appl. No.: 906,982

[22] Filed: Sep. 15, 1986

Related U.S. Application Data

[63] Continuation-in-part of Ser. No. 814,043, Mar. 27, 1985.

[51] Int. Cl.⁴ .............................................. E02F 5/00
[52] U.S. Cl. ...................................... 414/703; 172/445
[58] Field of Search .............. 414/703, 723, 680, 697, 414/700; 280/461 R, 461 A, 460 R, 460 A; 172/445

[56] References Cited

U.S. PATENT DOCUMENTS

| | | | |
|---|---|---|---|
| 2,760,284 | 8/1956 | Cook | 414/703 X |
| 2,772,798 | 12/1956 | McClenny | 414/703 X |
| 4,084,853 | 4/1978 | Keenan | 414/703 X |
| 4,103,796 | 8/1978 | Hare | 414/703 |

Primary Examiner—Robert J. Spar
Assistant Examiner—Donald W. Underwood
Attorney, Agent, or Firm—Zarley, McKee, Thomte, Voorhees & Sease

[57] ABSTRACT

A material handling attachment such as a bucket or the like is pivotally secured to the three-point hitch assembly of the tractor. The hitch assembly is movable between a lower position and an upper position by means of standard equipment on the tractor. A mechanical linkage interconnects the bucket, hitch assembly and the tractor so that the bucket will be in a substantially level position when the hitch assembly is in its lowermost position. As the hitch assembly is moved upwardly relative to the tractor, the linkage maintains the bucket in a level position. When the hitch assembly reaches its uppermost position, the linkage causes the bucket to be moved to a dumping position. After the material in the bucket has been dumped therefrom, the three-point hitch assembly is lowered with the bucket being automatically re-set to its operative or working position.

3 Claims, 5 Drawing Sheets

MATERIAL HANDLING ATTACHMENT FOR A TRACTOR HAVING A MULTIPLE-POINT HITCH ASSEMBLY

CROSS-REFERENCE TO RELATED APPLICATION

This is a continuation-in-part patent application of Ser. No. 814,043 filed Dec. 27, 1985.

BACKGROUND OF THE INVENTION

This invention relates to a material handling attachment for a tractor and more particularly to a material handling attachment for a tractor having a three-point hitch assembly.

Many types of tractor loaders or front-end loaders for tractors have been previously provided. Conventional tractor loaders normally include a frame assembly secured to the tractor frame with a pair of hydraulically controlled boom arms pivotally secured to the tractor frame. A bucket, forklift, etc. is normally attached to the forward ends of the boom arms and is also hydraulically controlled. The conventional tractor loaders are normally quite large and are expensive.

Many of the tractors available today have what is known as the three-point hitch assembly secured to the rearward end thereof. The three-point hitch assemblies normally include an upper arm and a pair of lower arms with either the upper arm or the pair of lower arms being connected to some sort of internal mechanism such as a hydraulic cylinder or the like to cause the hitch assembly to be vertically moved with respect to the tractor. The three-point hitch assemblies normally accommodate implements such as blades, disks, plows, etc. Attempts have been made in the past to mount material handling equipment such as a loader bucket or forklift to the three-point hitch assemblies but is believed that all of the previous attempts have utilized hydraulic cylinders pivotally connected to the buckets or forklifts to cause the pivotal movement of the material handling equipment relative to the three-point hitch assembly. The utilization of a hydraulic cylinder results in the need for quick couplers, hydraulic hoses, etc. in addition to the hydraulic cylinder itself. The addition of the couplers, hoses and cylinder adds considerably expense to the equipment and frequently results in oil leaks occurring. Additional controls are also required to cause the pivotal movement of the material handling equipment relative to the three-point hitch assembly. The device of the co-pending application represented a significant advance in the art. The device of the instant invention maintains the attachment in a "level" condition longer than the previous device and accelerates the dumping action when the dumping position is reached.

It is therefore a principal object of the invention to provide a material handling attachment for a tractor having a three-point hitch assembly.

A further object of the invention is to provide a material handling attachment for a tractor which includes self-leveling and automatic dumping features without requiring additional hydraulics.

Still another object of the invention is to provide a material handling attachment for a three-point hitch assembly which does not require the need for additional couplers, hoses, cylinder, valves, etc.

Still another object of the invention is to provide a material handling attachment for a tractor which has an improved cycle speed.

Yet another object of the invention is to provide a material handling attachment for a tractor which has an automatic re-set feature after the bucket has been automatically moved from its dumping position.

Still another object of the invention is to provide a material handling attachment for a tractor which utilizes only one control lever, namely, the control lever for the three-point hitch assembly which performs two separate functions.

Still another object of the invention is to provide a material handling attachment for a tractor which is easily and quickly mounted on the three-point hitch assembly and quickly and easily removed therefrom.

Still another object of the invention is to provide a device of the type described which is economical of manufacture and durable in use.

These and other objects will be apparent to those skilled in the art.

SUMMARY OF THE INVENTION

Figure 1:
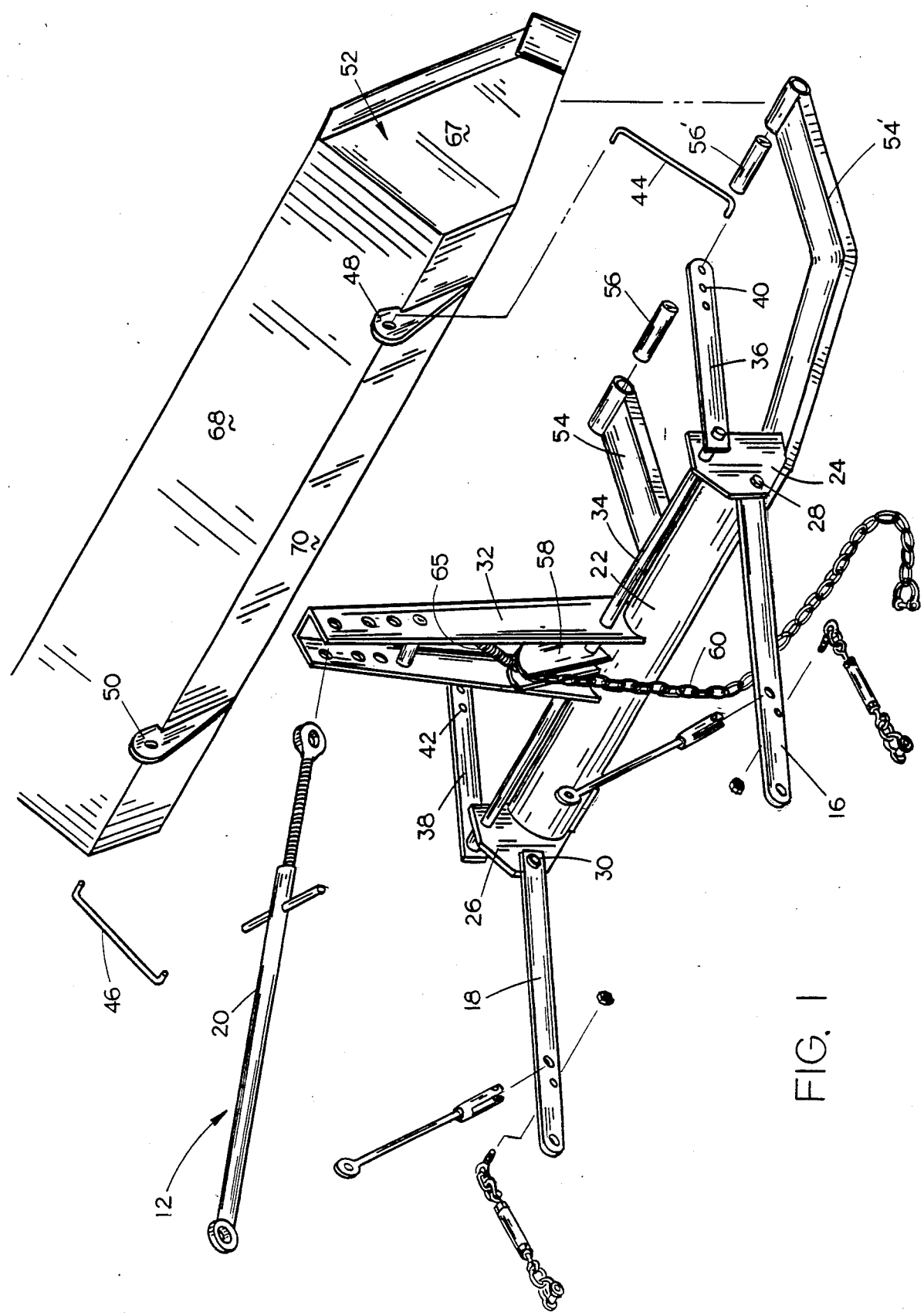
FIG. 1 is a front exploded perspective view of the attachment of this invention.

A material handling attachment such a bucket or the like is pivotally secured a three-point hitch assembly of a tractor. The hitch assembly is vertically movable between a lower position and a upper position by means of the standard equipment on the tractor. A mechanical linkage means interconnects the bucket, hitch assembly and the tractor in such a manner so that when the three-point hitch assembly is in its lower position, the weight of the bucket and the material therein will cause the bucket to be positioned in a substantially level position. As the three-point hitch assembly is moved upwardly relative to the tractor, the linkage means maintains the bucket in a level position. When the three-point hitch assembly reaches its upper position, the linkage means pivotally moves the bucket dumping position. After the material in the bucket has been dumped therefrom, the three-point hitch assembly is lowered with the bucket being automatically repositioned in its operative or working position.

DESCRIPTION OF THE PREFERRED EMBODIMENT

Although the material handling attachment described herein is preferably a loader bucket, other attachments could be substituted therefor such as a forklift or the like. Additionally, the three-point hitch assembly is described herein as being located on the rearward end of the tractor as is the general rule, it should be understood that the hitch assembly could also be mounted on the front end of the tractor.

The numeral 10 refers to a conventional tractor which has a vertically movable three-point hitch assembly 12 at either its forward or rearward end and which is commonly referred to as a multiple-point or three-point hitch. The bucket assembly of this invention is designated by the reference numeral 14 and is designed to be secured to the three-point hitch assembly of the conventional tractor whether the three-point hitch assembly is mounted on the rearward or forward ends of the tractor. Whether the hitch assembly is mounted on the forward or the rearward end of the tractor, the three-point hitch assembly will normally include a pair of lower link arms 16 and 18 and an upper link arm 20. The conventional tractor 10 includes means for vertically moving the hitch assembly in conventional fashion.

Bucket assembly 14 includes a horizontally disposed support 22 which has brackets 24 and 26 positioned at its opposite ends respectively. Brackets 24 and 26 are pivotally connected to the ends of link arms 16 and 18 by pins 28 and 30 respectively. Upstanding post 32 is secured to support 22 and has a shaft or rod 34 rotatably mounted thereon which extends laterally from both sides thereof. Shaft 34 is rotatably received in brackets 24 and 26 and has lever arms or links 36 and 38 connected to its ends for rotation therewith.

As seen in the drawings, arm 36 has a plurality of openings 40 formed therein while arm 38 has a plurality of openings 42 formed therein. One end of link 44 is pivotally received in one of the openings 40 in arm 36 and one end of link 46 is pivotally received by one of the openings 42 in arm 38. The other ends of links 44 and 46 are pivotally secured to brackets 48 and 50 which are secured to bucket 52. The forward ends of arms 54 and 54' are secured to support 22 by welding or the like. The rearward ends of arms 54 and 54' are secured to bucket 52 by removable pins 56 and 56' respectively.

The rearward ends of arms 54 and 54' are secured to the bucket at the forward end of blade cutting edge 57 so that rearward force is applied directly to the edge 57 rather than the bottom of the bucket thereby permitting the bucket to be constructed of a relatively light weight material.

Cam 58 is secured to shaft 34 within post 32 for rotation with shaft 34. One end of chain 60 is secured to the upper end of cam 58 as seen in the drawings. Chain 60 extends around roller 61 which is rotatably mounted on the tractor drawbar 62. The other end of chain 60 is secured to post 32 by means of pin 63. Spring 65 is provided for yieldably resisting the downward pivotal movement of cam 58.

Figure 2:
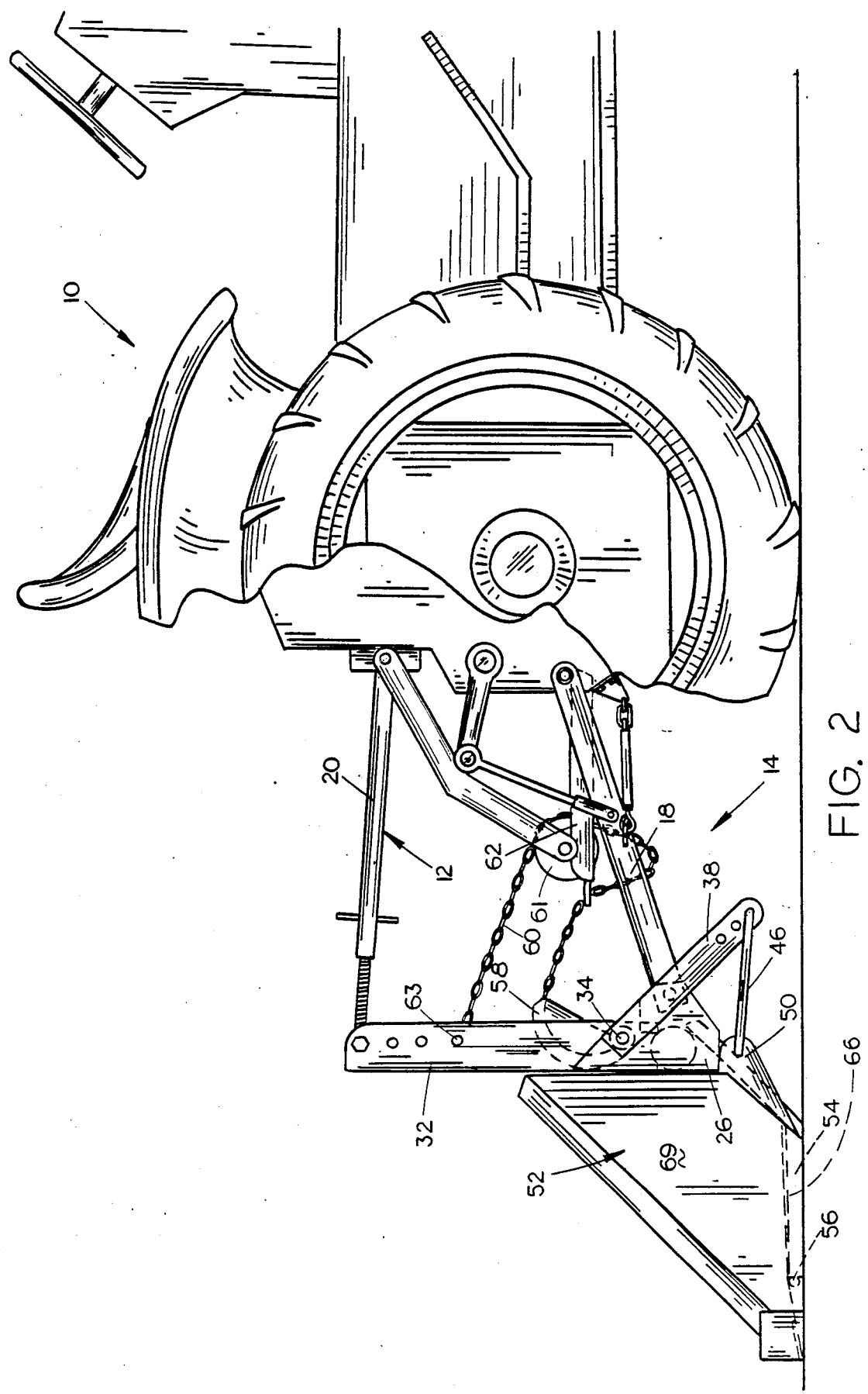
FIG. 2 is a side elevational view of the attachment of this invention mounted on a tractor illustrating the attachment in its lowermost position.
Figure 3:
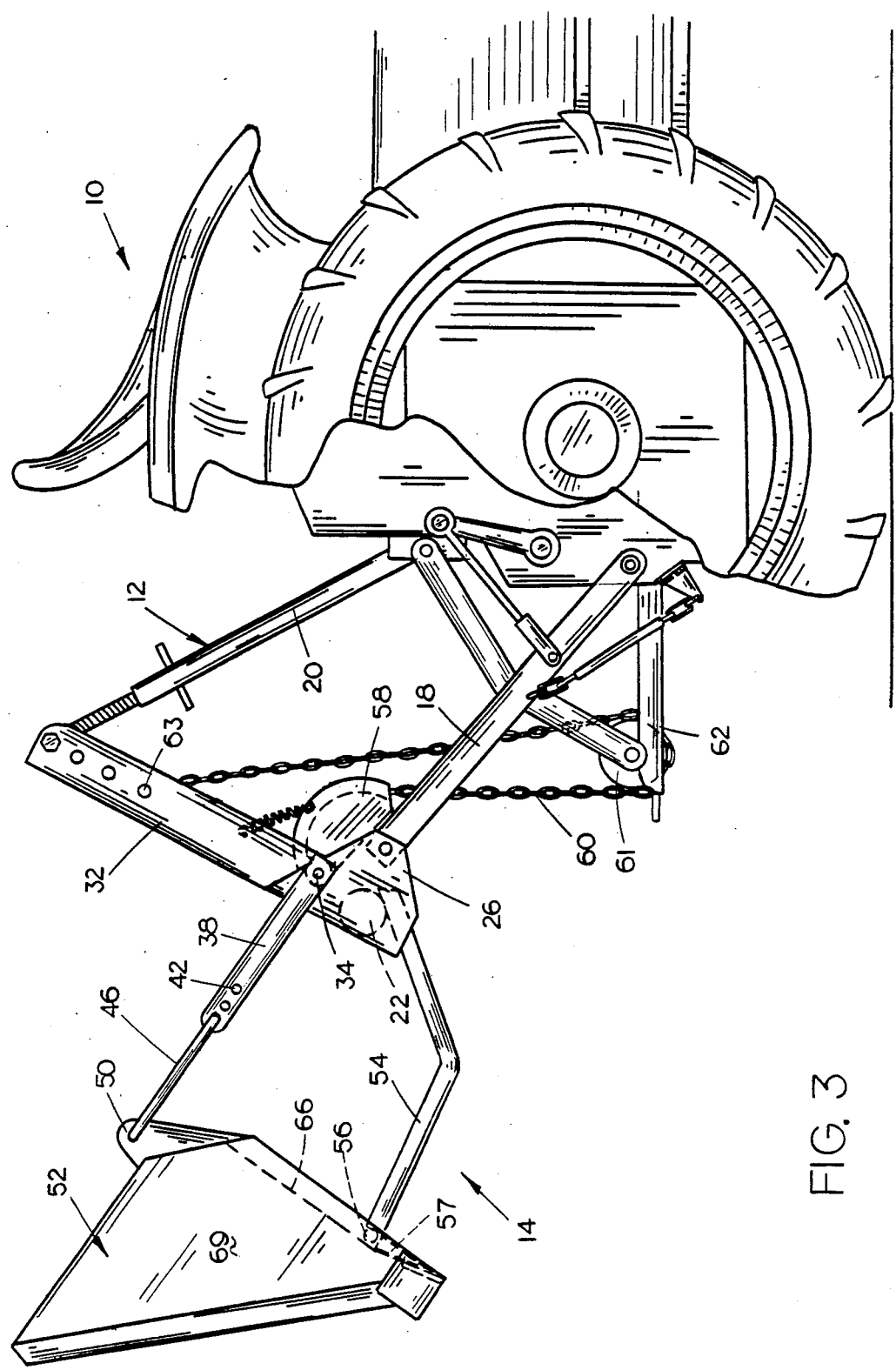
FIG. 3 is a view similar to FIG. 2 except that the attachment has been moved upwardly from the position of FIG. 2 and has been moved to its dumping position.

For purposes of description, bucket 52 will be described as including a bottom portion 66 which is horizontally disposed when the hitch assembly of the tractor is in its lowermost position as illustrated in FIG. 2. Bucket 52 also includes side walls 67 and 69 having back wall portions 68 and 70 extending therebetween.

Figure 4:
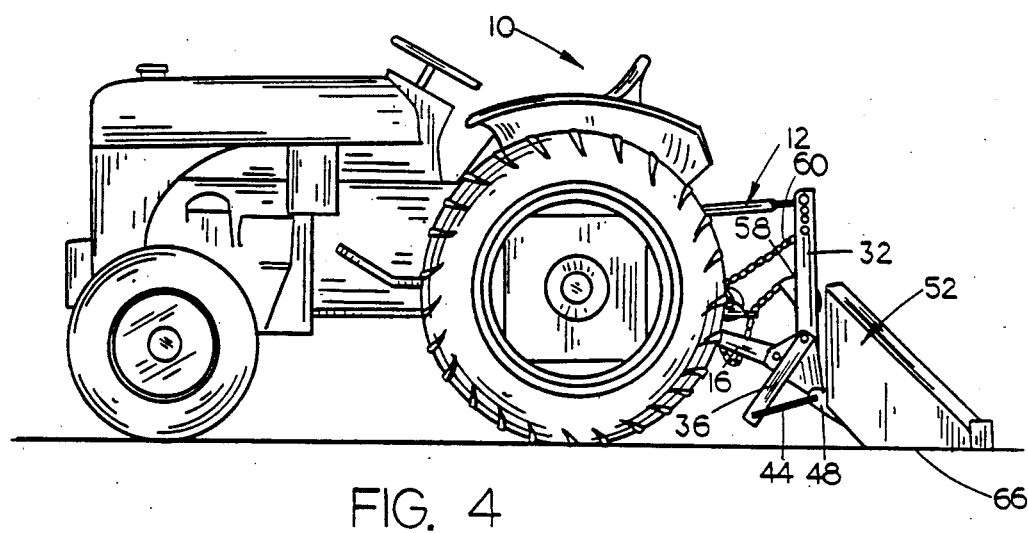
FIG. 4 is a side view of the loader bucket of this invention mounted on a tractor.
Figure 5:
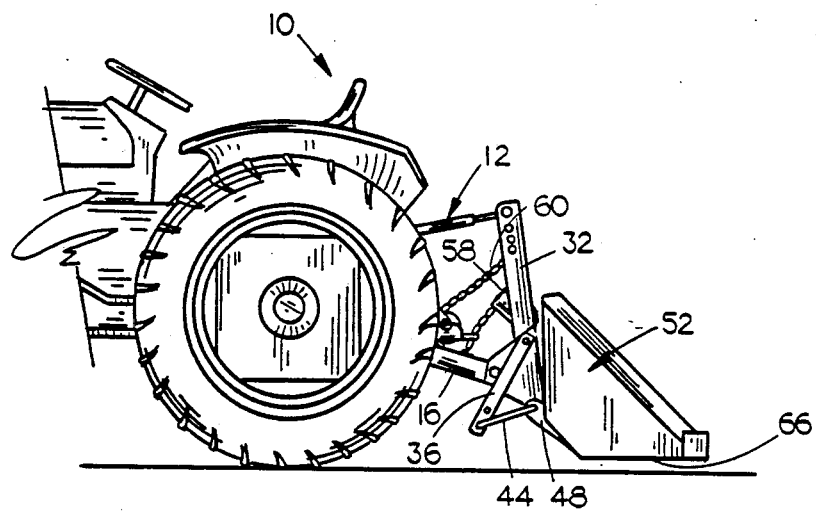
FIG. 5 is a view similar to FIG. 4 except that the loader bucket has been moved upwardly from the ground.
Figure 6:
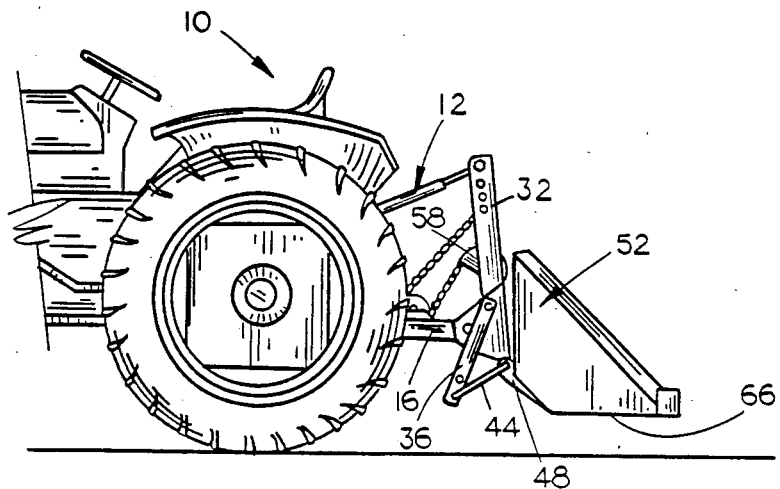
FIG. 6 is a view similar to FIGS. 4 and 5 except that the bucket has been moved upwardly from the position of FIG. 5 and illustrating the manner in which the bucket is maintained in a level condition as it is being vertically moved.
Figure 7:
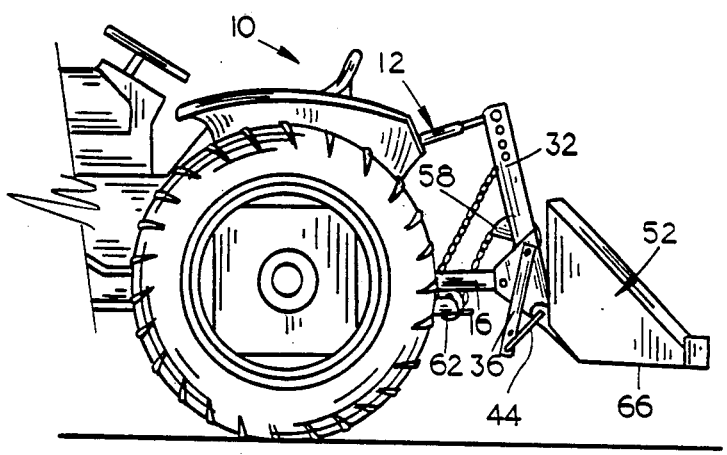
FIG. 7 is a view similar to FIGS. 4-6 except that the bucket has been vertically moved upwardly.
Figure 8:
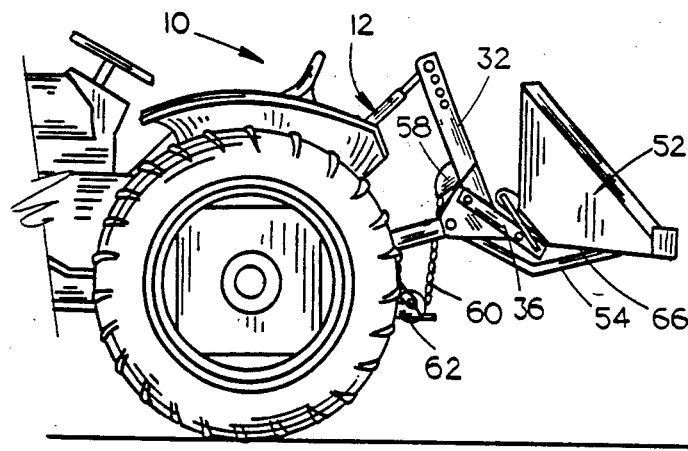
FIG. 8 is a view similar to FIGS. 4-7 except that the bucket is shown as it begins to dump.
Figure 9:
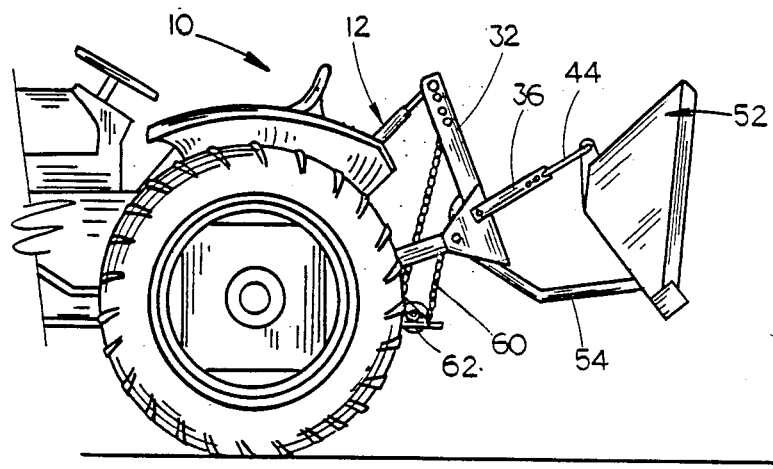
FIG. 9 is a view similar to FIGS. 4-8 but which illustrates the bucket in its dumping position.

In FIG. 4, the bucket 52 is illustrated in its lowermost position as is the three-point hitch assembly 12. When it is desired to move dirt or the like, the bucket 52 may be positioned as in FIG. 4 or any position thereabove such as illustrated in FIGS. 5, 6 or 7. The tractor is backed so that the bucket 52 is filled with the material to be transported. When the bucket has been filled, the bucket would normally be raised somewhat. The tractor is then driven to the location where the material is to be dumped or deposited. Continued vertical movement of the hitch assembly 12 from the position of FIG. 4 causes the bottom of the bucket to remain level as illustrated in FIGS. 4-7. The bucket is pivoted in a clockwise direction relative to the hitch assembly 12 as the hitch assembly 12 is vertically moved upwardly from the position of FIG. 4 to the position of FIG. 5. The clockwise rotation or pivotal movement of the bucket 52 is caused by the chain 60 causing cam 58 to rotate as the hitch assembly is moved upwardly relative to the ground. Rotation of the cam 58 causes the rearward ends of the arms 36 and 38 to be moved upwardly which in turn causes the links 44 and 46 to pivot the bucket 52 in a clockwise direction. The relationship of the arms 36, 38 and the links 44 and 46 with respect to the brackets 48 anad 50 prevents the bucket from dumping until the links 44 and 46 have moved from their "off-center" position of FIGS. 4-8. When the links 44 and 46 reach the position of FIG. 9, the bucket 52 freely tips into its dumping position.

When the material in the bucket has been dumped therefrom, the tractor operator lowers the hitch assembly 12. As the hitch assembly 12 is lowered, spring 65 assists cam 58 to pivotally initially move upwardly. The weight of the bucket causes cam 55 to pivot upwardly so that the rearward ends of arms 36 and 38 will be pivotally moved downwardly to pivotally move the bucket 52 towards its working position of FIG. 4.

The attachment of this invention enables a bucket or the like to be mounted on a conventional three-point hitch assembly of a tractor without the requirement of additional couplers, valves, hoses, or hydraulic cylinder being required. The bucket 52 can also be used in its open or dumping position as a push blade. The attachment is quickly and easily removed from the tractor by simply removing three pins. When the bucket is positioned on the rearward end of the tractor, the weight of the material in the bucket provides additional traction to the tractor especially those tractors with two-wheel, rear drive. Although the attachment is preferably suited for use with a loader bucket, a forklift or the like could be substituted therefor.

Thus is can be seen that a novel attachment has been described for use with a three-point hitch of a tractor which permits the operation of the attachment to be controlled by the control which is used to control the three-point hitch of the tractor. The attachment may be cycled quickly since the operator will not be required to operate an additional hydraulic cylinder which is normally required on conventional arrangements. The instant invention not only provides a relatively inexpensive means for securing a loader bucket or the like to a hitch assembly of a tractor but it also provides an assembly which may be easily and quickly mounted on the tractor or removed therefrom. The elimination of the costly hydraulic cylinder for controlling the pivotal movement of the bucket is very important. In addition, the elimination of a hydraulic cylinder for pivoting the bucket also results in that a recess is not required in the back wall of the bucket which is needed in conventional devices of the general type described due to the fact that space must be provided for accommodating the hydraulic cylinder causing the open portion of the bucket to be divided into two chambers.

A further advantage in the device of this invention is the favorable lift height obtained thereby as compared to conventional devices wherein the bucket sometimes contacts the ground when in its dumping position. This advantage is made possible by locating the pivot point of the bucket very near the cutting edge of the bucket so that the bucket pivots about its forward end.

Still another advantage of the present invention is that the mechanical linkage automatically pivotally moves the bucket into its dumping position without any action by the operator. In certain prior art devices, a separate hydraulic cylinder is required to dump the bucket. In certain other devices, the operator must manually operate a trip lever or the like to effect the dumping action.

A key feature of the instant invention is the fact that the pivotal connection of the bucket and its supporting structure results in substantial dumping action in a very short distance. The design of the unit is such that it has very good strength but can be easily disassembled for shipment by UPS or the like.

Thus it can be seen that the invention accomplishes at least all of its stated objectives.

We claim:

1. In combination,
   a tractor having a vertically movable three-point hitch assembly provided thereon, said hitch assembly being movable between a lower position and an upper position and comprising first and second lower link arms and an upper link arm, said link arms having rearward and forward ends,
   a materials handling bucket pivotally secured to said three-point hitch assembly for vertical movement therewith, said bucket being movable between working and dumping positions, said bucket having a bottom wall, spaced-apart side walls, and open rearward end, and a back wall,
   and mechanical linkage means interconnecting said bucket, said hitch assembly and said tractor which positions said bucket in its working position when said hitch assembly is in its said lower position and which pivots said bucket to dump as said hitch assembly moves to its upper position from a position slightly lower than its said upper position,
   said mechanical linkage comprising,
      an elongated horizontally disposed support positioned transversely with respect to the longitudinal axis of the tractor and having opposite ends,
      an upstanding post means secured at its lower end to said support at the center of said support, the rearward ends of said first and second lower link arms being pivotally secured to the opposite ends of said support, the rearward end of said upper link arm being pivotally secured to said upstanding post means adjacent the upper end thereof, a horizontally disposed shaft operatively rotatably mounted on said support and being parallel thereto, an actuator means mounted on said shaft to cause the rotation of said shaft, adjustablelength connection means extending between said actuator means and a fixed point on said tractor whereby upward movement of said hitch assembly will cause said shaft to be rotated, by said actuator means in a first direction, first and second arms rigidly secured to the opposite ends of said shaft and extending rearwardly therefrom, first and second spaced-apart support arms rigidly secured to said support and extending rearwardly therefrom, the rearward ends of said first and second support arms being pivotally secured to said bucket, first and second elongated links pivotally secured at one end to the rearward ends of said first and second arms respectively, the other ends of said links being pivotally secured to said bucket, the relationship of said bucket, links, arms and support arms being such that said bucket cannot be pivotally moved to its dumping position when said hitch assembly is in its said working position and will remain so until said hitch assembly is raised to a predetermined height relative to the tractor,
   a roller means rotatably mounted on the tractor,
   said connection means comprising a chain means secured at one end to said actuator means, said chain means extending around said roller means and being connected at its other end to said upstanding post means, to enable said bucket to quickly move into its said dumping position as said hitch assembly reaches its said upper position.

2. In combination,
   a tractor having a vertically movable three-point hitch assembly provided thereon, said hitch assembly being movable between a lower position and an upper position and comprising first and second lower link arms and an upper link arm, said link arms having rearward and forward ends,
   a materials handling bucket pivotally secured to said three-point hitch assembly for vertical movement therewith, said bucket being movable between working and dumping positions, said bucket having a bottom wall, spaced-apart side walls, and an open rearward end, and a back wall,
   and mechanical linkage means interconnecting said bucket, said hitch assembly and said tractor which positions said bucket in its working position when said hitch assembly is in its said lower position and which pivots said bucket to dump as said hitch assembly moves to its upper position from a position slightly lower than its said upper position,
   said mechanical linkage comprising,
      an elongated horizontally disposed support positioned transversely with respect to the longitudinal axis of the tractor and having opposite ends,
      an upstanding post means secured at its lower end to said support at the center of said support, the rearward ends of said first and second lower link arms being pivotally secured to the opposite ends of said support, the rearward end of said upper link arm being pivotally secured to said upstanding post means adjacent the upper end thereof, a horizontally disposed shaft operatively rotatably mounted on said support and being parallel thereto, an actuator means mounted on said shaft to cause the rotation of said shaft, adjustablelength connection means extending between said actuator means and a fixed point on said tractor whereby upward movement of said hitch assembly will cause said shaft to be rotated, by said actuator means in the first direction, first and second arms rigidly secured to the opposite ends of said shaft and extending rearwardly therefrom, first and second spaced-apart support arms rigidly secured to said support and extending rearwardly therefrom, the rearward ends of said first and second support arms being pivotally secured to said bucket, first and second elongated links pivotally secured at one end to the rearward ends of said first and second arms respectively, the other ends of said links being pivotally secured to said bucket, the relationship of said bucket, links, arms and support arms being such that said bucket cannot be pivotally moved to its dumping position when said hitch assembly is in its said working position and will remain so until said hitch assembly is raised to a predetermined height relative to the tractor, the rearward ends of said first and second support arms being pivotally secured to the bottom surface of said bottom wall of said bucket closely adjacent the open rearward end thereof.

3. The combination of claim 2 wherein said bucket includes a cutting edge at the open rearward end of said bottom wall, the rearward ends of said first and second support arms being operatively pivotally mounted adjacent said cutting edge.

* * * * *